US006911408B2

(12) United States Patent
Beunet et al.

(10) Patent No.: US 6,911,408 B2
(45) Date of Patent: Jun. 28, 2005

(54) LEAD-FREE ENAMEL COMPOSITION, THE CORRESPONDING ENAMELS AND GLASS-CERAMIC ARTICLES, A NEW LEAD-FREE MINERAL GLASS

(75) Inventors: Lionel Beunet, Fontainebleau (FR); Sebastien Hyvart, Epaux Bezu (FR); Fabrice Minier, Champagne sur Seine (FR); Sophie Peschiera, Champagne sur Seine (FR); Christophe Remy, Thomery (FR)

(73) Assignee: EuroKera, Chateau-Thierry (FR)

( * ) Notice: Subject to any disclaimer, the term of this patent is extended or adjusted under 35 U.S.C. 154(b) by 0 days.

(21) Appl. No.: 10/185,941

(22) Filed: Jun. 27, 2002

(65) Prior Publication Data
US 2003/0148868 A1 Aug. 7, 2003

(30) Foreign Application Priority Data

Jul. 9, 2001 (FR) .............................. 01 09080

(51) Int. Cl.[7] .............................. C03C 8/04; C03C 8/16; C03C 8/02; C03C 3/085
(52) U.S. Cl. .............................. 501/26; 501/14; 501/20; 501/21; 501/69
(58) Field of Search .............................. 501/14–21, 26, 501/68–70

(56) References Cited

U.S. PATENT DOCUMENTS 4,316,963 A * 2/1982 Hommel et al. .............. 501/14
4,883,705 A    11/1989 Kawakami et al. .......... 428/209
5,091,345 A *  2/1992 Becker ........................ 501/14
6,004,894 A * 12/1999 Faust et al. .................. 501/17
6,174,608 B1 *  1/2001 Bertocchi et al. ........... 428/426

FOREIGN PATENT DOCUMENTS

EP  0 657 391   11/1994   ........... C03C/3/078
FR  2 732 960   10/1996   ............. C03C/8/02

* cited by examiner

Primary Examiner—Karl Group
Assistant Examiner—Elizabeth A. Bolden
(74) Attorney, Agent, or Firm—Siwen Chen

(57) ABSTRACT

Objects of the present invention are:

a lead-free enamel composition comprising finely divided glass particles, finely divided pigment particles and an organic binder, characterised in that the glass of said particles is a lead-free mineral glass, essentially having the composition below, which is expressed in percentages by weight of oxides:

| $SiO_2$ | 45–60 | CaO | 0–12 |
|---|---|---|---|
| $B_2O_3$ | 0–10 | BaO | 13–27 |
| $Al_2O_3$ | 6–17 | ZnO | 3–17 |
| $Na_2O$ | 0–7 | MgO | 0–9 |
| $K_2O$ | 0–7 | $TiO_2$ | 0–2 |
| $Li_2O$ | 0–7 | $ZrO_2$ | 0–7 |
| with $Na_2O + K_2O + Li_2O > 4$ | | | | the enamel able to be obtained by firing of said composition;

glass-ceramic articles, which are decorated with said enamel; and new lead-free mineral glasses.

5 Claims, No Drawings

LEAD-FREE ENAMEL COMPOSITION, THE CORRESPONDING ENAMELS AND GLASS-CERAMIC ARTICLES, A NEW LEAD-FREE MINERAL GLASS

CROSS-REFERENCE TO RELATED APPLICATIONS

This application claims the benefit of French Application No. 01 09080, filed Jul. 9, 2001.

The invention relates to an original lead-free enamel composition, to the corresponding enamel and glass ceramic materials, as well as to a new lead-free mineral glass.

More specifically, the invention relates to:
- said lead-free enamel composition containing particles of a lead-free mineral glass;
- the enamel able to be obtained by firing of said composition;
- glass-ceramic articles decorated with said enamel, able to be obtained from said enamel composition;
- a new lead-free mineral glass particularly suitable as constitutive element of said enamel composition;
- the use of some lead-free mineral glass for manufacturing efficient enamels.

BACKGROUND OF THE INVENTION

In U.S. Pat. No. 4,883,705, some lead-free mineral glass compositions are also described within the context of the manufacturing of ceramic substrates used for electronic devices. Said compositions are characterized by a relatively low $SiO_2$ content (38 to 48% by weight), a relatively high ZnO content (10 to 20% by weight), a relatively high CaO content (1 to 8% by weight) and a relatively low $Li_2O+Na_2O+K_2O$ content (0 to 5% by weight).

Most of the commercial glass-ceramic cooktops are decorated with the aid of variously coloured enamels. Such a decoration on the one hand conforms to aesthetic criteria, which imply a large variety of tints and motifs, and on the other hand, aim to attain the objective of safety, in outlining with these decorations the location of the areas which heat and which, during the functioning of the cook top, are susceptible to attaining high temperatures.

The preparation of the enamels is normally done in several steps. First of all, a glass is melted according to classical glass industry techniques. This glass is then ground to a particle size which is compatible with the subsequent technique of application of the enamel onto the support to be enamelled (an application technique which generally consists in screen printing or decal(comania)). Pigments and/or opaque-making agents are added to the glass powder which are intended to confer to the final enamel its tint and its opacity. The resulting powdered mixture (glass powder+ pigments and/or opaque-making agents) is finally incorporated into an organic binder, in proportions which are adjusted to the viscosity desired for the resulting paste. The enamel composition thus obtained is ready for use.

The enamel composition is applied onto the substrate concerned, by direct screen printing, by transfer, by decal (comania) or by any other process, and then dried and fired by an appropriate heat cycle, which typically comprises a plateau at a temperature of greater than 900° C.

Beyond the two functions set forth above, (with reference to the aesthetics and to the safety), the enamel decorations must meet the physico-chemical requirements which arise from the conditions of use of the glass-ceramic cooktops, cooktops on which said decorations generally are incorporated. Thus, the decorations must be able to resist attack by acids and bases; they must be easy to clean, even after calcination of food remains; they must have a good resistance to abrasion, to friction with metallic pieces; they must not be sensitive to wrenching. The incorporation of said decorations must not either affect, too much, the mechanical strength of the tops on which they are incorporated. To the present day, certain tops on the market are susceptible to being broken, when a pressure of the order of 70 to 80 MPa is exerted on the enamelled face. Under certain conditions, especially of extreme transport and of storage, a resistance to a greater pressure (120–140 MPa) is required from the tops.

Traditionally, the introduction of lead oxide into the glass composition (entering in the composition of the enamel) strongly lowers its viscosity and thus guarantees a good coating, i.e. a good moistening and a good covering of the glass-ceramic by the enamel. However, in view of the present tendency to remove toxic elements from products used in cooking, we consider that the enamels used for the decoration of glass-ceramic cooktops must be free from such elements, and in particular free from heavy metals, such as lead.

According to prior art, within the context of a search for very efficient products, numerous lead-free glass compositions and enamel compositions which incorporate said glasses have been described.

In FR-A-2 686 333, glass compositions are described which are lead-free and cadmium-free and which are intended for vitrification, enamelling and decoration. Said compositions contain no lead, no cadmium, no zinc, no tin, no fluorine. They can in particular contain barium, between 0 and 12% by weight of barium oxide. Finally, they are characterised by a relatively high CaO content (3 to 18% by weight).

The Applicant has itself, in FR-A-2 732 960, described lead-free enamel compositions which comprise finely divided glass particles, finely divided pigment particles and an organic binder, which are characterised in that the glass has a thermal dilation coefficient less than or equal to 55 $10^{-7}/°$ K and has the following composition, in percentages by weight, on the basis of the oxides

| | |
|---|---|
| $SiO_2$ | 45–60 |
| $B_2O_3$ | 0–10 |
| $Al_2O_3$ | 6–17 |
| $Li_2O$ | 0–2 |
| $Na_2O$ | 0–3 |
| $K_2O$ | 0–3 |
| $Li_2O + Na_2O + K_2O$ | <4 |
| CaO | 0–12 |
| MgO | 0–9 |
| ZnO | 0–17 |
| BaO | 0–27 |
| SrO | 0–16 |
| CaO + MgO + ZnO + BaO + SrO | 22–42 |

-continued

| | |
|---|---|
| TiO$_2$ | 0–2 |
| ZrO$_2$ | 0–7 | said glass having a softening temperature T$_L$ greater than 680° C.

The Applicant has pursued its research work and is now in a position to be able to provide novel lead-free enamel compositions containing particles of lead-free mineral glass and the corresponding novel enamels.

DETAILED DESCRIPTION OF THE INVENTION

The enamels of the invention, which are classically made from said lead-free glasses, are particularly efficient in terms of resistance to friction with metallic pieces, and of resistance to wrenching. Furthermore, said enamels affect only slightly the mechanical strength of the glass-ceramic tops on which they can be disposed.

Said enamels of the invention are in fact analysed as improvements to those described in FR-A-2 732 960.

According to its first object, the present invention relates to lead-free enamel compositions which contain, classically, finely divided glass particles (generally of an average particle size of less than 5 μm), finely divided pigment particles, and an organic binder. Characteristically, said enamel compositions comprise particles of specific mineral glasses, which are lead-free (as well as free from any other toxic metal), and which are more particularly suitable for the making of enamels. Said mineral glasses essentially have the following composition by weight, (i.e. expressed in percentages by weight on the basis of the oxides):

| | |
|---|---|
| SiO$_2$ | 45–60 |
| B$_2$O$_3$ | 0–10 |
| Al$_2$O$_3$ | 6–17 |
| Na$_2$O | 0–7 |
| K$_2$O | 0–7 |
| Li$_2$O | 0–7 |
| with Na$_2$O + K$_2$O + Li$_2$O | >4 |
| CaO | 0–12 |
| BaO | 13–27 |
| ZnO | 3–17 |
| MgO | 0–9 |
| TiO$_2$ | 0–2 |
| ZrO$_2$ | 0–7 |

Silica is a classical component of the mineral glasses. It plays a predominant role on the properties such as the hardness of the glass and its chemical durability. Its content, within the used glasses, is greater than or equal to 45% so as to obtain the result expected in these terms of hardness and chemical durability. Its content does not exceed 60% in order to enable a correct fusion and a correct coating of the enamels incorporating said glasses.

B$_2$O$_3$ is generally incorporated within the glass in order to enable the viscosity of the enamel (prepared from said glass) to be lowered and therefore to enable a good coating on the substrate to be decorated to be guaranteed, while at the same time not causing an exaggerated increase in the coefficient of dilation. The quality of the coating directly influences the ease of cleaning of the enamel, which is better for smooth surfaces. B$_2$O$_3$ further improves the resistance to abrasion of the enamel. B$_2$O$_3$ must not be incorporated in excess (above 10%), since then an undesirable iridescence can appear around the enamel (enamel incorporating the said glass) decoration elements after firing of it. B$_2$O$_3$ is more often incorporated at the rate of 5 to 6% by weight. It develops a noticeable action from and above 0.5% by weight.

Al$_2$O$_3$ is incorporated at a concentration greater than or equal to 6%, so as to increase the hardness of the enamel. The alumina increases the micro-hardness of the enamel and therefore, especially, its resistance to scratching. Above 17% of Al$_2$O$_3$, the viscosity of the enamel becomes too high and jeopardises a correct coating of it.

Used individually or in combination, Li$_2$O, Na$_2$O and K$_2$O facilitate the melting of the glass and lower the viscosity of the enamel incorporating said glass (which thus favours its coating). These three oxides can be included, each one, up to 7% by weight and are incorporated, in any case, together, at more than 4% by weight. This teaching of the invention contradicts that of the application FR-A-2 732 960. The Applicant has presently established the positive consequence (notably in terms of resistance to wrenching and to friction with metallic pieces) of this higher content of oxide(s) of alkali metal(s). Within the context of an advantageous variant of the invention, it is recommended to incorporate said alkali metals at more than 4.5% by weight and more advantageously at more than 5% by weight:

advantageously Na$_2$O+K$_2$O+Li$_2$O>4.5; more advantageously>5.

CaO can be present to improve the chemical durability of the glass and the coating of the enamel incorporating said glass. It develops a noticeable action from and above 0.5% by weight. Its concentration in the composition of the glasses of the invention must not exceed 12%, in order to maintain a good resistance to abrasion. This oxide is advantageously incorporated at a low content, between 0 (0.5%) and 2% and more advantageously between 0 and <1%.

BaO is always present, in a relatively high content, from 13 to 27%. BaO thus guarantees a good chemical durability of the enamel which incorporates the glass. BaO is thus incorporated in order to improve the resistance to abrasion of the enamel. Used in a higher amount, it jeopardises the coating of the enamel.

ZnO is also always present, at a content between 3 and 17%, advantageously between 5 and 17% and more advantageously between 5 and <10%. Excessive amounts of ZnO can jeopardise the softening temperature of the glass, then of the enamel. ZnO confers resistance to abrasion to the enamel.

MgO, similarly, can confer a better resistance to abrasion to the enamel. MgO develops a noticeable action from and above 0.5%. Used beyond 9%, MgO can jeopardise the chemical durability of the enamel.

TiO$_2$ is suited to harden the final enamel. It plays a very positive role in the chemical durability of said enamel.

ZrO$_2$ is similarly suited to harden the final enamel. It also plays a very positive role in the chemical durability of said enamel. It does not increase the dilation of the glass. Its incorporation is limited to a maximum value of 7%, a value above which it becomes difficult to melt the glass without non-melted solid inclusions.

The essential constituents of the glasses of the enamel compositions of the invention—$SiO_2$, $Al_2O_3$, $Na_2O$ and/or $K_2O$ and/or $Li_2O$, BaO and ZnO—are advantageously incorporated in combination with at least one optional constituent—$B_2O_3$, CaO, MgO, $TiO_2$, $ZrO_2$—. The minimum amount of incorporation of said optional constituents is obviously that at which it develops an effect. This minimum amount is generally situated at 0.5%.

In addition to the essential and optional constituents set forth above, the glasses of the enamel compositions of the invention can contain other constituents. Obviously, they contain such constituents only in a limited amount (less than 5%, generally less than 2%), only in an amount which does not jeopardise the characteristics of the glasses and therefore the ones of the enamels of the invention. It is so in no way excluded that the glasses of the enamel compositions of the invention contain strontium oxide (SrO).

Particularly preferably, the glasses of enamel compositions of the invention essentially have the composition below, which is expressed in percentages by weight of oxides:

| | |
|---|---|
| $SiO_2$ | 45–55 |
| $B_2O_3$ | 4–6 |
| $Al_2O_3$ | 6–8 |
| $Na_2O$ | 2–4 |
| $K_2O$ | 2–4 |
| $Li_2O$ | 1–3 |
| CaO | 0–2 |
| BaO | 16–19 |
| ZnO | 6–10 |
| MgO | 3–5 |
| $TiO_2$ | 0–2 |
| $ZrO_2$ | 1–3 |

Within the said preferred composition, advantageously:
$Na_2O+K_2O+Li_2O>5$; and/or
CaO 0–<1.

As regards the pigments (and/or opaque-making agents) and the binders which can be incorporated within the lead-free enamel compositions of the invention, in the making of said enamels, these are conventional pigments (and/or opaque-making agents) and binders, which are conventionally incorporated.

Classically, white enamels are obtained by the addition of cerium oxide and/or titanium oxide, the average particle size of which is of the order of and generally less than 1 μm, not only with reference to the coloration power and opaque-making power of said oxides, but also in order to guarantee a good resistance to the abrasion of the final enamel (in order to minimise, even to prevent, any receding of pigment grains out of said final enamel). The use of titanium oxide is particularly recommended.

Other oxides, such as those of iron, chromium, cobalt, zinc, manganese, alone, in a mixture, or added to the cerium oxide and/or titanium oxide, are used in order to obtain coloured enamels, notably brown enamels.

The amount of addition by weight of the pigments to the basic glass is typically of the order of 10 to 40% (by weight) according to the colour and opacity desired.

Any type of organic binder can be incorporated in the composition of the invention, and in particular binders which are based on pine oil or on acrylic resins, at contents which typically range between 30 and 60% by weight. The proportion of incorporation of such a binder determines the viscosity of the paste and enables the thickness of the enamel after firing to be adjusted.

The enamel compositions of the invention, which are heat treated, classically, generate the enamels of the invention, which constitute the second object of said invention.

Said enamels are more particularly suitable for the decoration of glass-ceramic articles. Said articles, decorated with the enamels of the invention obtained from an enamel composition of the invention, constitute the third object of said invention.

Notably, these glass-ceramic articles are glass-ceramic cooktops. It has already been understood that the invention has in particular been developed in this context.

Said enamels, which are disposed on a glass-ceramic top, maintain an acceptable resistance of the enamelled face, have good chemical durability characteristics, good cleanability characteristics, and good wrenching resistance characteristics, and good characteristics of resistance to abrasion.

Among the glasses having the composition specified above—glasses which are constitutive elements of the enamel compositions of the invention—some are novel and constitute a fourth object of said invention. The said fourth object consists of the mineral glasses essentially have the following composition by weight, (i.e. expressed in percentages by weight on the basis of the oxides):

| | |
|---|---|
| $SiO_2$ | 45–60 |
| $B_2O_3$ | 0–10 |
| $Al_2O_3$ | 6–17 |
| $Na_2O$ | 0–7 |
| $K_2O$ | 0–7 |
| $Li_2O$ | 0–7 |
| with $Na_2O + K_2O + Li_2O$ | >5 |
| CaO | 0–12 |
| BaO | 13–27 |
| ZnO | 3–17 |
| MgO | 0–9 |
| $TiO_2$ | 0–2 |
| $ZrO_2$ | 0–7 |

Advantageously said mineral glasses have the composition indicated above with the ZnO content between 5 and 17% by weight and more advantageously between 5 and <10% by weight.

Advantageously said lead-free mineral glasses have the composition indicated above with CaO content between 0 and 2% by weight and more advantageously between 0 and <1% by weight.

Particularly preferably, the glasses of the invention essentially have the composition below, which is expressed in percentages by weight of oxides:

| | |
|---|---|
| $SiO_2$ | 45–55 |
| $B_2O_3$ | 4–6 |
| $Al_2O_3$ | 6–8 |
| $Na_2O$ | 2–4 |
| $K_2O$ | 2–4 |
| $Li_2O$ | 1–3 |
| with $Na_2O + K_2O + Li_2O$ | >5 |

-continued

|  |  |
|---|---|
| CaO | 0–2 |
| BaO | 16–19 |
| ZnO | 6–10 |
| MgO | 3–5 |
| TiO$_2$ | 0–2 |
| ZrO$_2$ | 1–3 |

The original glasses provided are more particularly interesting when used as a raw material in the manufacturing of enamels (see above).

Lastly, the invention concerns, according to its fifth object, the use of a lead-free mineral glass essentially having the composition below, which is expressed in percentages by weight of oxides:

|  |  |
|---|---|
| SiO$_2$ | 45–60 |
| B$_2$O$_3$ | 0–10 |
| Al$_2$O$_3$ | 6–17 |
| Na$_2$O | 0–7 |
| K$_2$O | 0–7 |
| Li$_2$O | 0–7 |
| with Na$_2$O + K$_2$O + Li$_2$O | >4.5 |
| CaO | 0–2 |
| BaO | 13–27 |
| ZnO | 3–17 |
| MgO | 0–9 |
| TiO$_2$ | 0–2 |
| ZrO$_2$ | 0–7 | for manufacturing a lead-free enamel.

EXAMPLES

The invention is illustrated by the Examples below (Examples 4 to 7). The usefulness thereof emerges from the consideration of said Examples 4 to 7 and of that of Comparative Examples 1 to 3. Examples 1 and 2 illustrate the teaching of FR-A-2 732 960, Example 3 illustrates the effect of the non-incorporation of ZnO in the composition of the glass. Examples 5 to 7 illustrate glasses and enamel compositions of the invention. Example 4 illustrates another enamel composition of the invention.

Table 1 below presents a group of lead-free glass compositions which enable the preparation of enamels for decoration of glass-ceramic tops. These glass compositions are expressed, in percentages by weight, on the basis of the oxides.

It is to be noted that it is possible for the glasses to be melted from usual starting materials, in the form of oxides or other compounds, which by decomposition get converted into oxides, in the proportions desired. For example, lithium carbonate and sodium nitrate can be used as sources of lithium and sodium, respectively.

The glasses are melted at 1,550° C., in an amount which is sufficient in order that after grinding, sufficient material be available for the remainder of the process. At the end of the melting cycle, i.e. typically after 5 hours at the above-mentioned temperature, a part of the glass is poured into water, then dried in an oven, while the remaining part is poured in the form of a top, in order to enable the characterisation of the glass.

The glass poured into the water is in the form of unshaped fragments which are dried, ground and sieved in several steps, until a sufficiently fine average particle size (less than 5 $\mu$m) for the further enamel application process be obtained. The grinding is carried out, for example, with the aid of aluminium bead grinders, either dry or in an alcoholic medium. The powder collected is then dried and undergoes a check of the particle size.

At this stage, the pigments are added, mixed with the glass powder obtained previously. The whole obtained is optionally ground again. The nature and the amount of these pigments depend upon the colour sought for the final enamel.

The pigments used within the context of these Examples are marketed by the company DMC$^2$ under the denominations X 928, B 768, EV1082. The following was in fact added:

12% by weight of X 928
10% by weight of B 768
8% by weight of EV 1082, to 70% by weight of sintered glass for Examples 1, 2 and 5;
6% by weight of X 928
5% by weight of B 768
4% by weight of EV 1082, to 85% by weight of sintered glass for Examples 3, 4, 6 and 7.

The last step of preparation of the enamel consists in incorporating an organic binder into the powdered mixture of the glass and the pigments.

Within the context of the Examples, a type of organic binder is incorporated which is pine oil-based. The enamel compositions constituted contain in the order of 50% by weight of said binder.

The application of said enamel compositions onto a glass-ceramic substrate was made by direct screen printing. The tops used are those marketed by the Applicant, EUROKERA, under the trademark Kérablack, described in U.S. Pat. No. 5,070,045.

The firing of the enamel composition was then carried out according to a heat cycle comprising a plateau at a temperature of 925° C. for 20 minutes. Upon completion of this cycle, the enamel layer typically has a thickness of the order of 3 to 5 $\mu$m.

The enamelled tops were tested:
in terms of mechanical strength: their modulus of rupture (MOR: expressed in MPa) by means of a three-point setting apparatus, the decorated surface being in extension;
they were also subjected to a normalised resistance to rupture test. The percentage of broken samples was recorded for a given impact energy (expressed in Joules), the impact due to a falling pan;
in terms of resistance to wrenching : an adhesive tape (Scotch® type) is stuck onto the enamel of the top an then wrenched off with a given force. It is then noted whether the enamel is wrenched;
in terms of resistance to friction with metallic pieces: the decorated surface is rubbed with various metallic pieces (pans or coins). The intensity of the marks and the ease of removing them was then evaluated by using commercial products which are sold specially for cleaning this type of top (glass-ceramic tops decorated with enamelled motifs). The overall result is marked up to 20. The better the mark, the greater the resistance to friction by metals is.

The results of said tests are given in the second part of Table 1 below.

The tops of the invention are more than suitable with reference to the other properties, developed in FR-A-2 732 960.

TABLE 1

|  | FR-A-2 732 960 | | | INVENTION | | | |
| --- | --- | --- | --- | --- | --- | --- | --- |
|  | 1 | 2 | 3 | 4 | 5 | 6 | 7 |
| Composition (% by weight) | | | | | | | |
| $SiO_2$ | 51.4 | 51.3 | 55 | 50 | 49.5 | 49.1 | 48.6 |
| $B_2O_3$ | 5.5 | 5.5 | 6.9 | 5.5 | 5.4 | 5.4 | 5.4 |
| $Al_2O_3$ | 7.2 | 7.2 | 7.1 | 7.3 | 7.2 | 7.1 | 7.1 |
| $Na_2O$ | 2 | 2.6 | 2.6 | 2.7 | 4.4 | 2.6 | 2.6 |
| $K_2O$ | — | — | 3.3 | — | — | 2.7 | 3.3 |
| $Li_2O$ | 1.3 | 1.2 | 1.3 | 2.1 | 1.3 | 1.3 | 1.3 |
| CaO | 5 | 0.6 | 0.6 | 0.6 | 0.6 | 0.6 | 0.6 |
| BaO | 13.7 | 18 | 17.8 | 18.2 | 18 | 17.8 | 17.8 |
| ZnO | 7.1 | 8 | 0 | 8.1 | 8 | 8 | 8 |
| MgO | 3.1 | 3.8 | 3.8 | 3.8 | 3.8 | 3.8 | 3.8 |
| $ZrO_2$ | 1.7 | 1.7 | 1.7 | 1.8 | 1.8 | 1.7 | 1.7 |
| % pigment used | 30% | 30% | 15% | 15% | 30% | 15% | 15% |
| MOR (MPa) | 122 | 149 | 130 | 145 | 122 | 154 | 140 |
| % breakage after impact at (Joules) | 0% at 3 J | 0% at 3 J | 100% at 2.3 J | 0% at 3 J | 0% at 3 J | 0% at 3 J | 20% at 3 J |
| Wrenchings | Some | Some | Some | None | None | None | None |
| Mark (/20) of the tests of friction with metallic pieces | 10 | 13 | 17.5 | 14 | 15 | 16.5 | 17.5 |

The enamels of the invention are indeed more efficient than the enamels of the prior art.

The enamels obtained from the glass compositions of the invention are more efficient than the enamels obtained from the glass compositions according to FR-A-2 732 960. They exhibit a notable gain in terms of resistance to wrenching and resistance to friction with metallic pieces, without generating a degradation of the mechanical strength of the tops on which they are incorporated (to enamel them).

Example 3 illustrates the necessity for the glass composition precursor to contain zinc. Sid zinc enables the enamelled top to present an increased mechanical strength (evaluated notably by the test to measure the percentage of breakage after impact) and simultaneously, enables the enamel to present a good resistance to wrenching and a good resistance to friction with metallic pieces.

What is claimed is:

1. A lead-free enamel composition consisting of finely divided glass particles, finely divided pigment particles and an organic binder, characterised in that the glass of said particles is a lead-free mineral glass, essentially having the composition below, which is expressed in percentages by weight of oxides:

| | |
| --- | --- |
| $SiO_2$ | 45–60 |
| $B_2O_3$ | 0–10 |
| $Al_2O_3$ | 6–17 |
| $Na_2O$ | 0–7 |
| $K_2O$ | 0–7 |
| $Li_2O$ | 0–7 |
| with $Na_2O + K_2O + Li_2O$ | >4 |
| CaO | 0–12 |
| BaO | 13–27 |
| ZnO | 3–17 |
| MgO | 0–9 |
| $TiO_2$ | 0–2 |
| $ZrO_2$ | 0–7. |

2. The enamel composition according to claim 1, wherein the said mineral glass has essentially the composition indicated with:

$Na_2O+K_2O+Li_2O>4.5$.

3. The enamel composition according to claim 1 or 2, wherein the said mineral glass has essentially the composition indicated with:

ZnO 5–17.

4. The enamel composition according to claim 1 or 2, wherein the said mineral glass has essentially the composition indicated with:

CaO 0–2.

5. A lead-free enamel composition comprising finely divided glass particles, finely divided pigment particles and an organic binder, characterised in that the glass of said particles is a lead-free mineral glass, essentially having the composition below, which is expressed in percentages by weight of oxides:

| | |
|---|---|
| SiO$_2$ | 45–55 |
| B$_2$O$_3$ | 4–6 |
| Al$_2$O$_3$ | 6–8 |
| Na$_2$O | 2–4 |
| K$_2$O | 2–4 |
| Li$_2$O | 1–3 |
| with Na$_2$O + K$_2$O + Li$_2$O | >5 |
| CaO | 0–2 |
| BaO | 16–19 |

-continued

| | |
|---|---|
| ZnO | 6–10 |
| MgO | 3–5 |
| TiO$_2$ | 0–2 |
| ZrO$_2$ | 1–3. |

* * * * *